United States Patent [19]

Frazier et al.

[11] Patent Number: 4,519,512

[45] Date of Patent: May 28, 1985

[54] CANTILEVER RACK CONSTRUCTION

[75] Inventors: Donald Frazier, Calderwoods, Farhills, N.J. 07931; J. Hartley Daniels, Bethlehem, Pa.; Daniel W. Clapp, Hackettstown, N.J.

[73] Assignee: Donald Frazier, Farhills, N.J.

[21] Appl. No.: 450,511

[22] Filed: Dec. 20, 1982

[51] Int. Cl.³ .................................................. A47D 5/10
[52] U.S. Cl. ..................................... 211/193; 248/245; 248/72; 248/231.6; 403/188
[58] Field of Search ................. 211/193, 189, 207; 108/108, 109; 248/225.4, 226.3, 72, 316.3, 228, 316.1, 245; 403/233, 234, 237, 256, 49, 188

[56] References Cited

U.S. PATENT DOCUMENTS

| | | | |
|---|---|---|---|
| 2,607,278 | 8/1952 | Hill | 248/228 X |
| 3,124,330 | 3/1964 | Robinson | 248/228 |
| 3,217,833 | 11/1965 | Smith | 248/228 X |
| 3,335,992 | 8/1967 | Frazier | 248/245 |
| 3,489,291 | 1/1970 | Frazier | 211/193 |
| 3,918,590 | 11/1975 | D'Altrui | 211/193 |
| 4,065,089 | 12/1977 | Frazier et al. | 248/245 |
| 4,291,812 | 9/1981 | Harmes et al. | 211/207 |
| 4,447,029 | 5/1984 | Chapman | 211/193 X |

FOREIGN PATENT DOCUMENTS 1542616  2/1969  France .

Primary Examiner—Robert W. Gibson, Jr.
Attorney, Agent, or Firm—J. W. Molasky & Assocs.

[57] ABSTRACT

A cantilever rack construction for holding material in which there is a base with a generally vertical column having a generally vertically extending web and flange, a cantilever arm, and a pair of connectors for mounting the cantilever arm on the flange of the vertical column, each of the connectors being secured to the cantilever arm and adapted to be mounted on said column at a flange portion. The connectors are constructed and arranged to contact the flange portions at a medial location between the tip and the web thereof.

17 Claims, 9 Drawing Figures

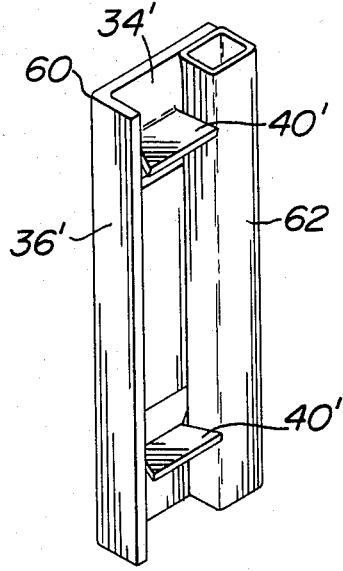
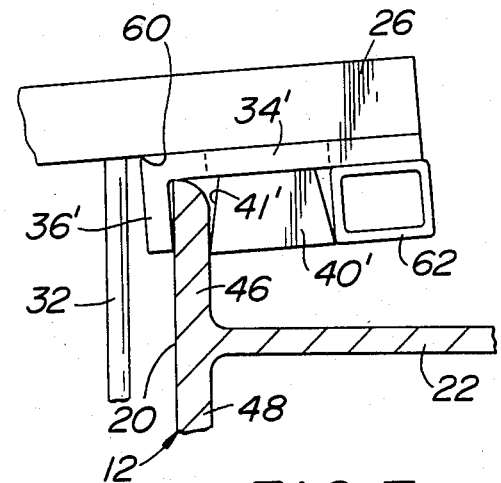
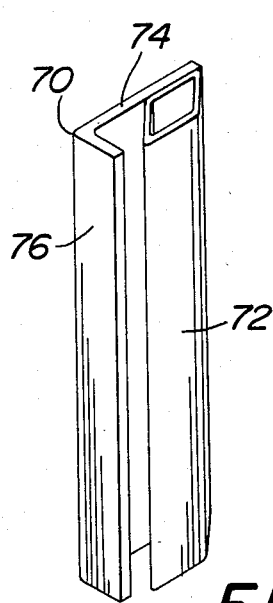
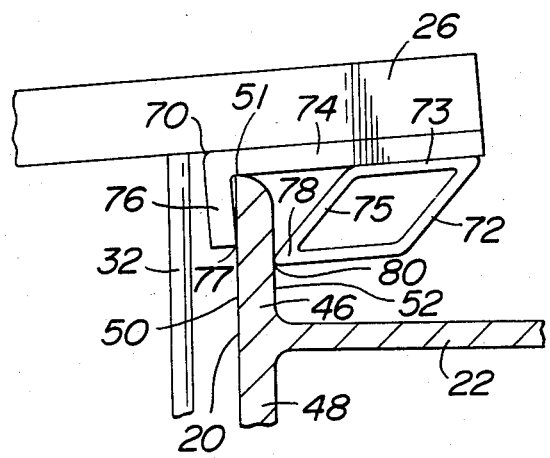

CANTILEVER RACK CONSTRUCTION

BACKGROUND OF THE INVENTION

This invention relates generally to rack structures and more particularly to a cantilever rack construction having horizontal arms adapted to frictionally engage with a strong binding action a vertical column in order to support heavy weights and yet be infinitely adjustable as to height.

There is a need in industry for storage facilities capable of storing long heavy objects above the floor. Since the quantity and size of objects to be stored varies from time to time, the spatial dimensions of the rack should be variable so as to permit the storage of larger or smaller amounts of material. Also, the arms must be capable of resisting slippage or deformation. Furthermore, when several varieties of related materials are to be stored, the storage racks must be capable of being adjusted easily to add or delete supporting arms to the rack in order to accommodate separately additional varieties of material.

Numerous specialty racks are known, as is exemplified by the rack structure shown in U.S. Pat. No. 3,854,686. However, these specialty racks use non-standard fabricated parts and are expensive to manufacture. Also, conventional racks may be somewhat deficient in their ability to support a great weight of material and are frequently difficult to set up, and to demount or ship. Further, many conventional racks are not capable of duplex usage, ie., the arrangement whereby cantilever arms extend toward the front and toward the back of the rack. Moreover, other conventional cantilever racks are only adjustable to discrete elevations and are not infinitely adjustable.

It has been found that a vertical column in the nature of an I-beam attached to a suitable base can be provided with a readily adjustable horizontal cantilever arm that has great strength, such rack being capable of having additional cantilever arms applied from time to time as required. The cantilever arms are readily adjustable and are provided with generally vertical, opposing channels which, with a binding action, frictionally engage the flanges of the I-beam type of vertical column so as to provide a support arm of great strength. This type of cantilever rack is shown in U.S. Pat. Nos. 3,335,992 and 3,489,291 which have the features of being readily adjustable to various heights while at the same time permitting the application of a plurality of superimposed arms without the necessity of removing the arms or slipping them over the top.

Other known types of cantilever arms are those shown in U.S. Pat. Nos. 3,251,478 and 4,065,089.

By the early 1970's steel manufacturers converted from tapered-flange sections to parallel-flange Universal, or Wide Flange, beam sections. The parallel-flange beam section is being adopted by the art since it is a more economical section for most purposes. However, the parallel flange itself is weaker than the tapered flange which creates problems in the use of the cantilever racks of the indicated type because of the increasing possibility of failure of the column flanges. While this problem is partially overcome by the design shown in U.S. Pat. No. 4,065,089 because the point of load is at the root of the fillet of the flange as compared with the tip of the flange, there are other problems created with the loading at the root fillet such as penetration failures in light flange columns from the point loading of this construction. Also, this construction is undesirable in that it is necessary to mount all the cantilever arms on the column from the top down.

A limitation of the prior art cantilever rack constructions is their capability of carrying very heavy loads. Under these heavy load conditions the prior art devices are subject to the possibility of column flange tip failure and failure of the connector between the horizontal arm and the column flange.

SUMMARY OF THE INVENTION

It is the general object of this invention to provide a cantilever rack construction of the indicated type which is capable of withstanding high loadings without failure. The improved cantilever rack construction of the invention comprises a connector design which is constructed and arranged to contact the flange of the vertical column of the rack at medial locations between the tip of the flange and the web of the flange to thereby minimize the possibility of column flange failure. Furthermore, the connector design in accordance with the invention comprises means providing torsional rigidity to the connector for resisting the torsional forces applied to the connector when the cantilever rack is loaded.

Briefly stated, the objects of the invention are achieved by the provision of a cantilever rack construction which comprises a vertical column including a generally vertically extending web and flange, the flange having portions extending in both directions from the web with each flange portion having an outer face and an inner face. The rack also comprises a cantilever arm, and a pair of connectors for mounting the cantilever arm on the column flange to extend generally perpendicularly therefrom. Each of the connectors is secured to the cantilever arm and each is adapted to be mounted on the column at one of the flange portions. Each of the connectors comprises a first rigid portion constructed and arranged to contact the outer face of an associated flange portion at a medial location between the tip of the flange portion and the web and a second rigid portion constructed and arranged to contact the inner face of the associated flange portion at a medial location between the tip of the flange portion and the web. Also, each connector comprises a portion extending along the length thereof to provide torsional rigidity to the connector configuration. In accordance with one form of the invention the means for providing the torsional rigidity is in the form of a tubular configuration extending along the length of the connector.

A feature of the connector design in accordance with the invention is that it permits the use of a lighter column flange and, therefore, the use of cheaper columns than was heretofore possible. Moreover, it is possible to achieve a substantially greater load capacity for a given channel arm than was possible heretofore.

BRIEF DESCRIPTION OF THE DRAWINGS

FIG. 6 is a perspective view of a third form of connector for use in the cantilever rack construction of the invention.

FIG. 7 is a fragmentary sectional view showing the manner in which the connector of FIG. 6 is used in the cantilever construction of the invention.

FIG. 8 is a perspective view of a fourth form of connector for use in the cantilever rack construction of the invention.

FIG. 9 is a fragmentary sectional view showing the manner in which the connector of FIG. 8 is used in the cantilever rack construction of the invention.

DETAILED DESCRIPTION OF THE PREFERRED EMBODIMENT

Figure 1:
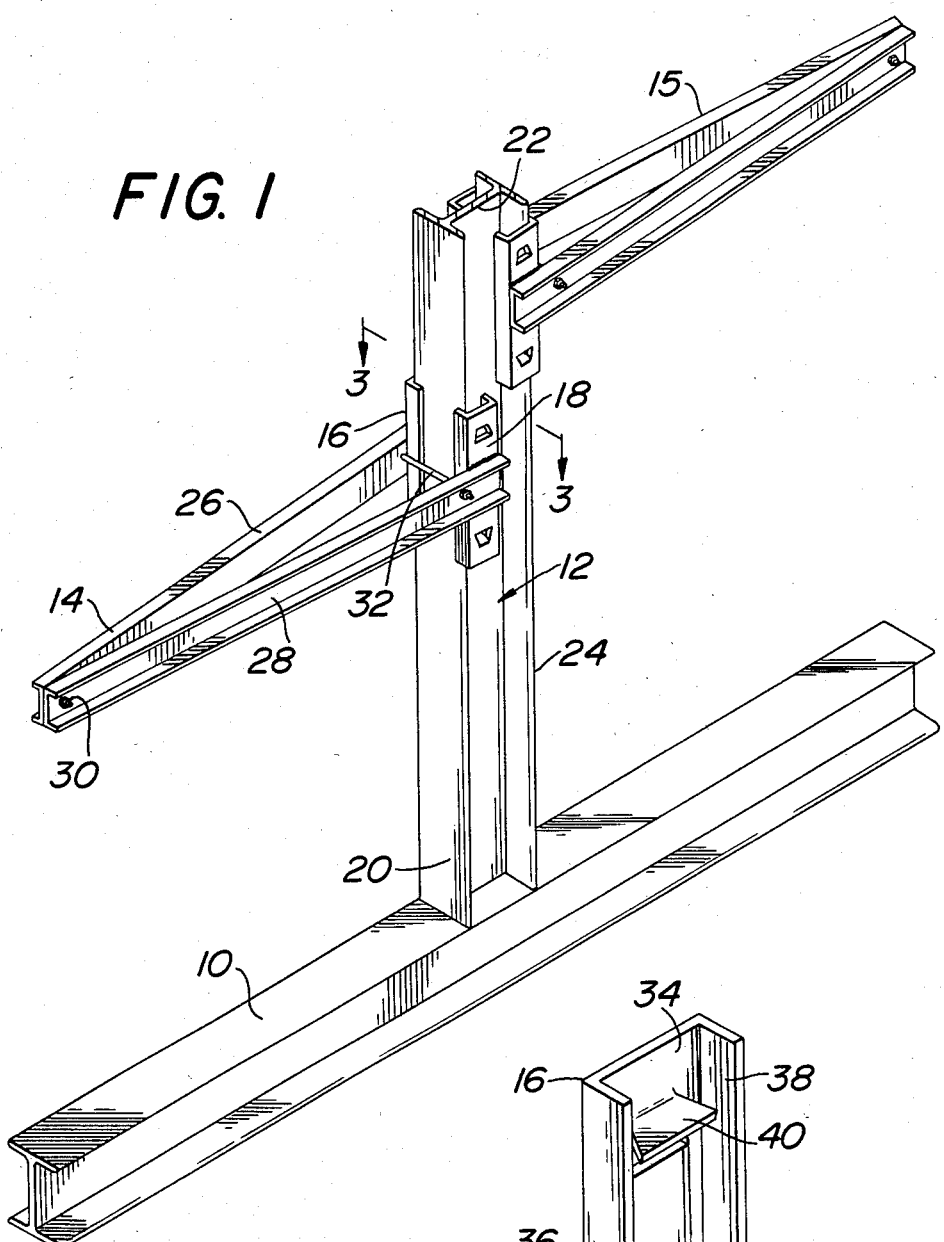
FIG. 1 is a perspective view of a double-sided cantilever rack construction in accordance with the invention.

Referring initially to FIG. 1, the cantilever rack construction of the invention comprises a base 10 in the form of an I-beam resting on one of its flanges, a vertical column 12 in the form of an I-beam welded at its lower end onto the top flange of base 10, a horizontally extending cantilever arm 14, and a pair of connectors 16 and 18 for mounting cantilever arm 14 on a flange 20 of column 12 to extend generally perpendicularly thereto. Column 12 comprises a vertical web 22 extending between flange 20 and a flange 24 on which is mounted another cantilever arm 15 extending from column 12 in the opposite direction from cantilever arm 14 as, is shown in FIG. 1.

Base 10 and column 12 form a rigid welded assembly known in the art as a double-sided upright. FIG. 1 shows one of these uprights with arms mounted thereon. In a typical storage rack for use in storing long objects, there would be provided a row of these uprights with arms thereon and horizontal bracing between pairs of adjacent uprights, the arms being adjusted to the appropriate height for supporting the objects. It will be apparent that there may be provided a single-sided upright comprised of a vertical column with arms mounted to extend in only one direction therefrom.

Figure 3:
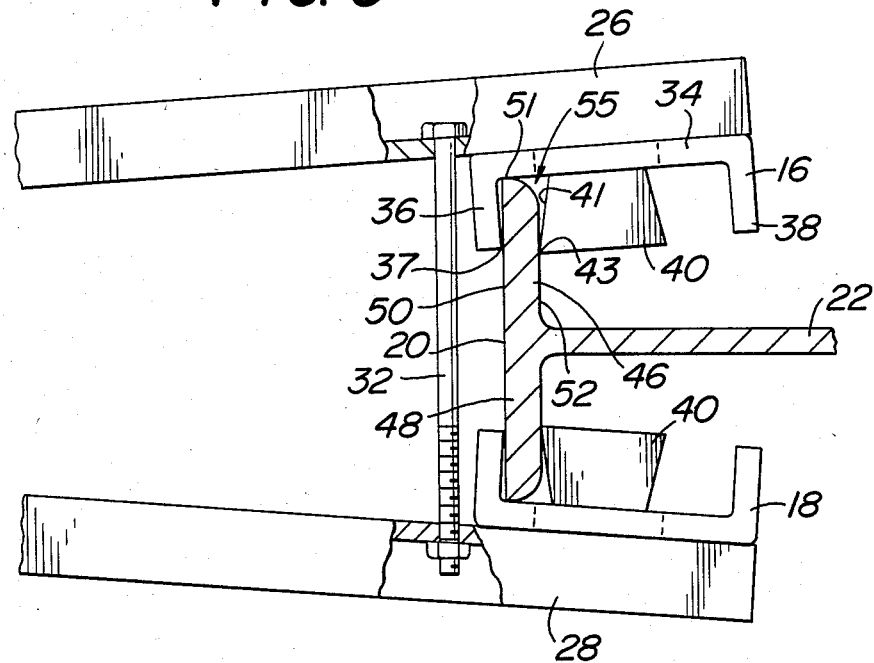
FIG. 3 is a fragmentary sectional view taken on line 3—3 of FIG. 1.

Cantilever arm 14 is comprised of a pair of U-shaped channels 26 and 28 arranged back-to-back and secured together tightly at their extended end by a bolt 30. At their other end, channels 26 and 28 have connectors 16 and 18, respectively, welded thereto, as is best shown in FIG. 3, a bolt 32 extending between channel 26 and 28 for use in causing connectors 16 and 18 to become clamped or frictionally engaged with flange 20 for mounting arm 14 on column 12. As will be apparent more fully hereafter, bolt 32 can be tightened to cause connectors 16 and 18 to move together to frictionally engage flange 20 at its tips only for positioning arm 14 at any desired vertical height. The loosening of bolt 32 enables the easy vertical adjustment of arm 14. Also, the loosening of bolt 30 permits horizontal adjustment of the position of channels 26 and 28 of arm 14, which adjustment is useful in aiming arm 14 with relation to web 22 of column 12. Once arm 14 is set in position, the load applied thereto causes a substantial binding action between connectors 16 and 18 and flange 20 to maintain arm 14 in the set position. Moreover, the heavier the load on arm 14, the tighter the binding action.

Figure 2:
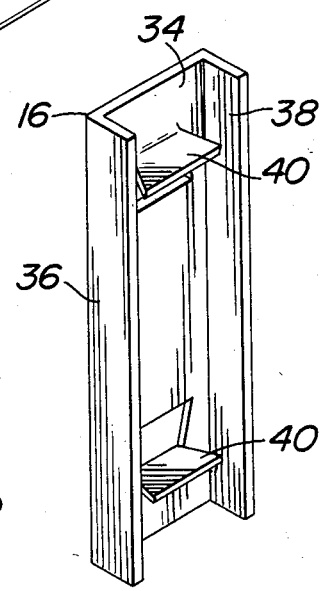
FIG. 2 is a perspective view of the connector used in the cantilever rack shown in FIG. 1.

Connector 16 is shown in detail in FIG. 2, it being noted that connector 18 has an identical construction with connectors 16 and 18 being mounted on channels 26 and 28 in an "opposed hand" relation, ie., one is the mirror image of the other as can be seen in FIG. 3. Accordingly, only connector 16 will be described in detail, the construction and arrangement of connector 18 being apparent from this detailed description and from a consideration of the Drawings.

Connector 16 is comprised of a U-shaped channel having a web portion 34, a pair of flange portions 36 and 38. At locations near the ends of web portion 34 there are provided a pair of cutout portions 40, which portions are formed by punching out a trapezoid-shaped portion from web portion 34 by conventional practice.

As shown in FIG. 3, connectors 16 and 18 are mounted on flange 20 of column 12, connectors 16 and 18 being constructed and arranged so as to frictionally engage the flange portions 46 and 48 of flange 20. Thus, flange portion 46 of column flange 20 is received between connector flange portion 36 and an opposed edge 41 of each cutout portions 40. By this arrangement, flange portion 36 provides a first rigid portion constructed and arranged to contact the outer face 50 of column flange portion 46 at a medial location, indicated at 37, between the tip 51 thereof and web 22, and cutout portions 40 provide a second rigid portion constructed and arranged to contact the inner face 52 of column flange portion 46 at a medial location, indicated at 43, between tip 51 and web 22.

As is apparent from the above description and from a consideration of FIG. 3, the above-defined first and second rigid portions of connector 16 have opposed portions spaced apart an amount greater than the spacing between outer face 50 and inner face 52 of flange portion 46 so as to be clear of contact with said flange portions in the region between said medial locations 37 and 43 and the tip 51 of flange portion 52. This clearance region is indicated at 55. It is this clearance that prevents the connectors 16 and 18 from contacting the flange portions 46 and 48 in the above-described locations so as to reduce the possibility of producing any twisting action on the flange portions 46 and 48 as was described above.

Figure 4:
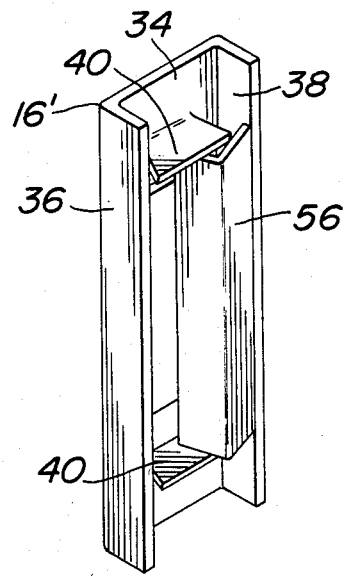
FIG. 4 is a perspective view of a second form of connector for use in the cantilever rack construction of the invention.
Figure 5:
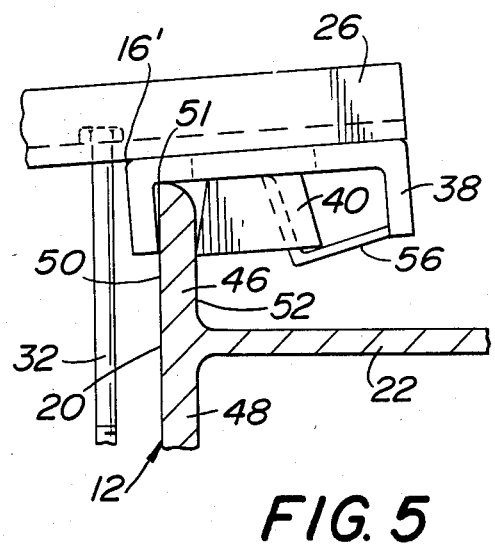
FIG. 5 is a fragmentary sectional view showing the manner in which the connector of FIG. 4 is used in a cantilever rack construction of the invention.

In FIGS. 4 and 5 there is shown a second form of connector for use in the cantilever rack construction of the invention. The connector shown in FIGS. 4 and 5 is indicated at 16' and is comprised of a channel-shaped configuration and cutout portions constructed and arranged identically with those of connector 16 wherefore corresponding parts have been given like reference numerals. The only difference between connector 16 and 16' is that connector 16' has added thereto an angle member 56 secured at its edges, by welding, to the web portion 34 of the channel-shaped connector 16' and to an end portion of the flange 38, as is apparent from consideration of FIGS. 4 and 5. The addition of the angle member 56 provides a tubular configuration extending along the length of connector 16' for providing torsional rigidity to the connector configuration, the advantage of the torsion resisting means being that it increases the load capacity of the connector construction as described above.

In FIGS. 6 and 7 there is shown another connector 60 for use in the cantilever rack construction of the invention. Connector 60 is essentially the same as connector 16', the only difference being that the means for providing the torsional resistance comprises a rectangular tubular member 62 instead of angle member 56 and flange portion 38 of connector 16'. Otherwise, connector 60 comprises the same parts as connector 16' wherefore corresponding parts have been given the same reference numerals with primes added.

Connector 60 is comprised of an L-shaped channel having a web portion 34' and a flange portion 36'. At locations near the ends of web portion 34' there are provided a pair of cutout portions 40' which are formed by punching out trapezoid-shaped portions of web portion 34'.

As mounted on column flange 20, connector 60 is constructed and arranged so as to frictionally engage the flange portion 46 of column flange 20 in the manner shown in FIG. 7, which is identical to the arrangement shown in FIGS. 3 and 5. Thus, flange portion 46 of column flange 20 is received between flange portion 36' and an opposite edge 41' of the cutout portion 40', with flange portion 36' providing a first rigid portion and cutout portions 40' providing the second rigid portion as described above. Tubular member 62 extends along the length of connector 60 and is welded to the web portion 34' whereby it serves to resist torsional forces applied to connector 60 when the cantilever rack construction is placed under load.

In FIGS. 8 and 9 there is shown another connector 70 for use in the cantilever rack construction of the invention. Connector 70 is similar to connectors 16' and 60 but replaces both the cutout portions and the tubular member thereof with a singular tubular member 72 having a parallelogram cross-section. Thus, tubular member 72 provides the dual function of providing the torsional resistance for the connector 60 and providing a portion contacting the inner face 52 of the column flange portion 46 at a medial location between its tip 51 and web 22, as is apparent from consideration of FIG. 9.

Connector 70 is comprised of an L-shaped channel having a web portion 74 and a flange portion 76. Tubular member 72 is welded to web portion 74 in a position such that one side 73 thereof is in contact with web portion 74 and another side 75 thereof extends from side 73 at an angle toward flange portion 76. By this arrangement, a corner 78 of tubular member 72 is arranged to contact 80 at a medial location between tip 51 and web 22 of column flange 20.

As mounted on flange portion 46 of column 12, connector 70 is constructed and arranged so as to frictionally engage the flange portion 46 of flange 20 in the manner shown in FIG. 9. Thus, flange portion 46 of column flange 20 is received between flange portion 76 and the opposing side 75 of tubular member 72, with flange portion 36 providing a first rigid portion constructed and arranged to contact the outer face 50 of column flange portion 46 at a medial location 77 between tip 51 and web 22 and corner 78 of tubular member 72 provides a second rigid portion constructed and arranged to contact the inner face 52 of column flange portion 46 at a medial location 80 between tip 51 and web 22.

As is apparent from a consideration of FIG. 9, the first and second rigid portions described above have opposed portions spaced apart an amount greater than the spacing between the inner and outer faces of the column flange portion so as to be clear of contact therewith in the region between said medial locations 77 and 80 and the tip 51 of the flange. By this configuration, connector 70 is clear of contact with the column flange portion 46 in the region between the medial locations 77 and 80 and the tip 51 of the flange so as to avoid contact therewith when connector 70 is placed under a loaded condition. This minimizes the possibility of the twisting of the flange and enhances the capacity of the connector construction.

It will be apparent that the foregoing description is intended to illustrate several embodiments of the invention and that the various parts shown and described may have substitutes which may perform a substantially similar function. It will also be apparent that these substitutes may be well known and are contemplated as being within the scope of the invention as defined by the appended claims.

What is claimed is:

1. A cantilever rack construction comprising:
   a vertical column including a generally vertically extending web and flange, said flange having portions extending in both directions from said web, each flange portion having an outer face and an inner face,
   a cantilever arm, and
   a pair of connectors for mounting said cantilever arm on said flange of said column to extend generally perpendicularly from the outer faces of said flange portions,
   each of said connectors being secured to said arm and adapted to be mounted on said column at one of said flange portions,
   each of said connectors comprising a first rigid portion constructed and arranged to grip the outer face of an associated flange portion at a limited medial location between the tip of said flange portion and said web and away from said tip, and
   a second rigid portion constructed and arranged to grip the inner face of said associated flange portion at a limited medial location between the tip of said flange portion and said web and away from said tip.

2. A cantilever rack construction according to claim 1 wherein said first and second rigid portions have opposed portions spaced apart an amount greater than the spacing between said outer and inner faces of said flange portions so as to be clear of contact with said flange portions in the region between said medial locations and the tip of the flange.

3. A cantilever rack construction according to claim 1 wherein each of said connectors is provided with tubular-shaped means for resisting torsional forces applied to said connectors when said cantilever rack construction is loaded.

4. A cantilever rack construction according to claim 1 wherein each connector comprises a third rigid portion extending along the length thereof to provide torsional rigidity to the connector configuration.

5. A cantilever rack construction according to claim 4 wherein said last-named portion is constructed and arranged to form a tubular configuration extending along the length of the connector.

6. A cantilever rack construction according to claim 5 wherein each of said connectors comprises a channel-shaped configuration having a web and a flange, said means forming said tubular configuration comprising said flange of said channel and an angle member secured at its edges to the web of said channel and an end portion of said flange of said channel.

7. A cantilever rack construction according to claim 6 wherein said first rigid portion of each of said connectors comprises a second flange of said channel configuration and said second rigid portion of each of said connectors comprises a pair of cutout portions from said web of said channel configuration.

8. A cantilever rack according to claim 7 wherein said second flange portion of said channel-shaped configuration and said cutout portion of said web have opposed portions extending from the tip of said column flange portions to said medial location, said opposed portions being spaced apart an amount greater than the spacing between said outer and inner faces of said column flange portions so as to be clear of contact with said column flange portions.

9. A cantilever rack construction according to claim 1 wherein each of said connectors comprises a channel-shaped configuration having a web portion joined with a flange portion extending generally perpendicularly therefrom, said first rigid portion of each of said connectors comprising said flange portion of said channel-shaped configuration, and said second rigid portion of each of said connectors comprising a pair of cutout portions from said web of said channel-shaped configuration.

10. A cantilever rack construction according to claim 9 wherein said flange portion of said channel-shaped configuration and said cutout portions of said web have opposed portions extending from the tip of said column flange portions to said medial location, said opposed portions being spaced apart an amount greater than the spacing between said outer and inner faces of said column flange portions so as to be clear on contact with said column flange portions.

11. A cantilever rack construction according to claim 3 wherein said torsion resistance providing means comprises a tubular member extending along the length of said connector and wherein said second rigid portion comprises a pair of cutout portions located near the upper and lower ends of said connector.

12. A cantilever rack construction according to claim 3 wherein each of said connectors comprises a channel-shaped configuration having a web portion joined with a flange portion extending generally perpendicular therefrom, said first rigid portion of each of said connectors comprising said flange portion of said channel-shaped configuration, and said second rigid portion of each of said connectors comprising a pair of cutout portions from said web of said channel-shaped configuration.

13. A cantilever rack construction according to claim 12 wherein said torsion resistance providing means comprises a tubular member secured to the web portion of said channel-shaped configuration.

14. A cantilever rack construction according to claim 12 wherein said flange portion of said channel-shaped configuration and said cutout portion of said web have opposed portions extending from the tip of said column flange portions to said medial location, said opposed portions being spaced apart an amount greater than the spacing between said outer and inner faces of said column flange portions so as to be clear of contact with said column flange portions.

15. A cantilever rack construction according to claim 1 wherein said connector comprises a channel-shaped configuration having a web portion joined with a flange portion extending generally perpendicularly thereto, said first rigid portion of each of said connectors comprising said flange portion of said channel-shaped configuration, and wherein each of said connectors includes a tubular member extending along the length thereof, said tubular member providing said second rigid portion.

16. A cantilever rack according to claim 15 wherein said tubular member has a corner portion thereof contacting said inner face of said flange portion at said medial location thereof.

17. A cantilever rack according to claim 16 wherein said tubular member has a parallelogram-shaped cross-section.

* * * * *